(12) United States Patent
Pradhan et al.

(10) Patent No.: US 11,189,069 B1
(45) Date of Patent: Nov. 30, 2021

(54) SYSTEMS FOR PARTIALLY UNDOING CONTENT EDITING OPERATIONS

(71) Applicant: Adobe Inc., San Jose, CA (US)

(72) Inventors: Sandeep Pradhan, Noida (IN); Abhishek Garg, Rohini (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 17/198,614

(22) Filed: Mar. 11, 2021

(51) Int. Cl.
*G06T 11/60* (2006.01)
*G06F 3/0484* (2013.01)
*G06T 11/20* (2006.01)

(52) U.S. Cl.
CPC .......... *G06T 11/60* (2013.01); *G06F 3/04842* (2013.01); *G06F 3/04847* (2013.01); *G06T 11/203* (2013.01)

(58) Field of Classification Search
CPC .... G06T 11/60; G06T 11/203; G06F 3/04847; G06F 3/04842
See application file for complete search history.

(56) References Cited

U.S. PATENT DOCUMENTS

| | | | | |
|---|---|---|---|---|
| 7,609,278 B1* | 10/2009 | Dash | ..................... | G06F 3/0481 345/418 |
| 8,643,650 B1* | 2/2014 | Vinchon | ............... | G06F 17/175 345/442 |
| 2008/0180410 A1* | 7/2008 | McCall | ................. | G06T 11/203 345/179 |
| 2008/0252645 A1* | 10/2008 | Mouilleseaux | ..... | G06F 3/04845 345/442 |
| 2011/0298807 A1* | 12/2011 | Kim | ..................... | G06T 11/203 345/442 |
| 2013/0120439 A1* | 5/2013 | Harris | ..................... | G06T 13/80 345/619 |

* cited by examiner

*Primary Examiner* — William A Beutel
(74) *Attorney, Agent, or Firm* — FIG. 1 Patents

(57) ABSTRACT

In implementations of systems for partially undoing content editing operations, a computing device implements an undo system to receive editing data describing coordinates of an editing operation performed relative to digital content rendered in a user interface of a display device. The undo system determines at least one coordinate between a starting coordinate of the editing operation and an ending coordinate of the editing operation. Input data is received that describes a request to partially undo the editing operation. The undo system undoes a portion of the editing operation performed between the at least one coordinate and the ending coordinate of the editing operation.

20 Claims, 15 Drawing Sheets

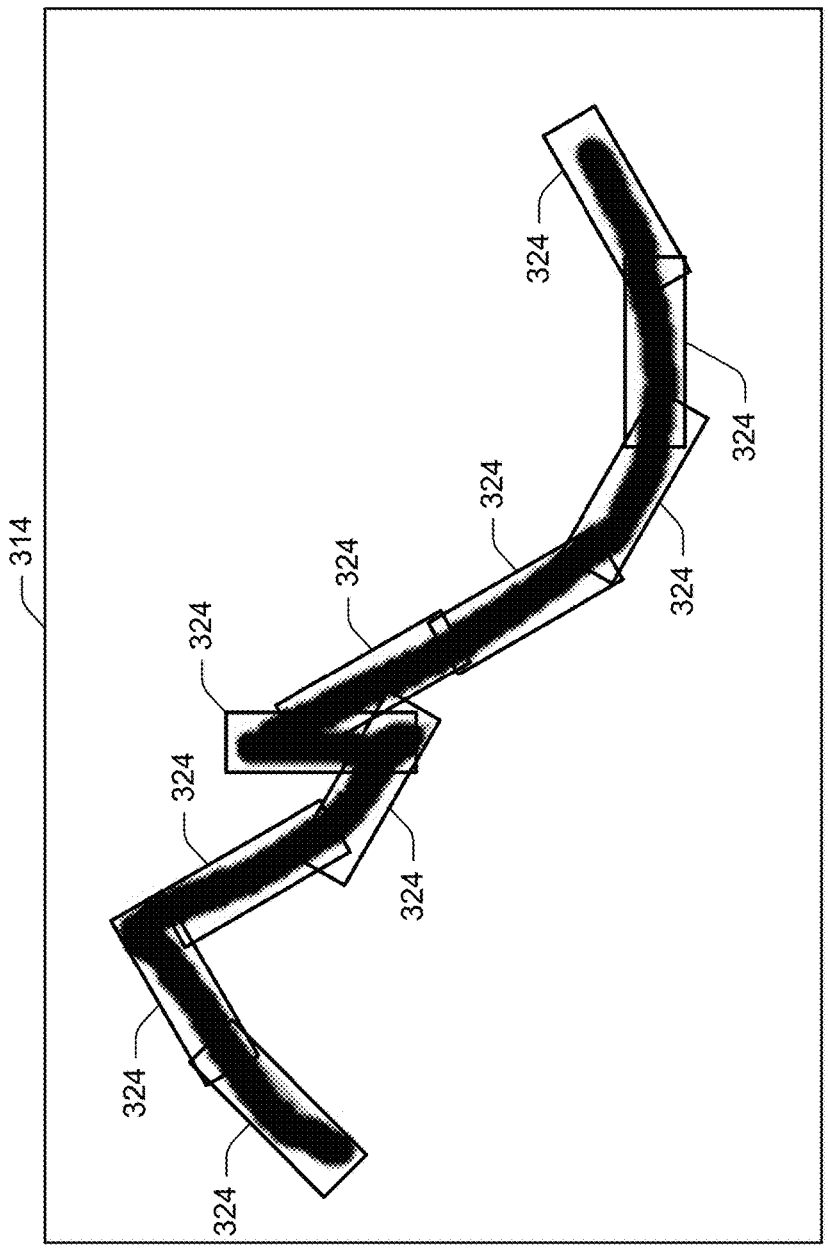

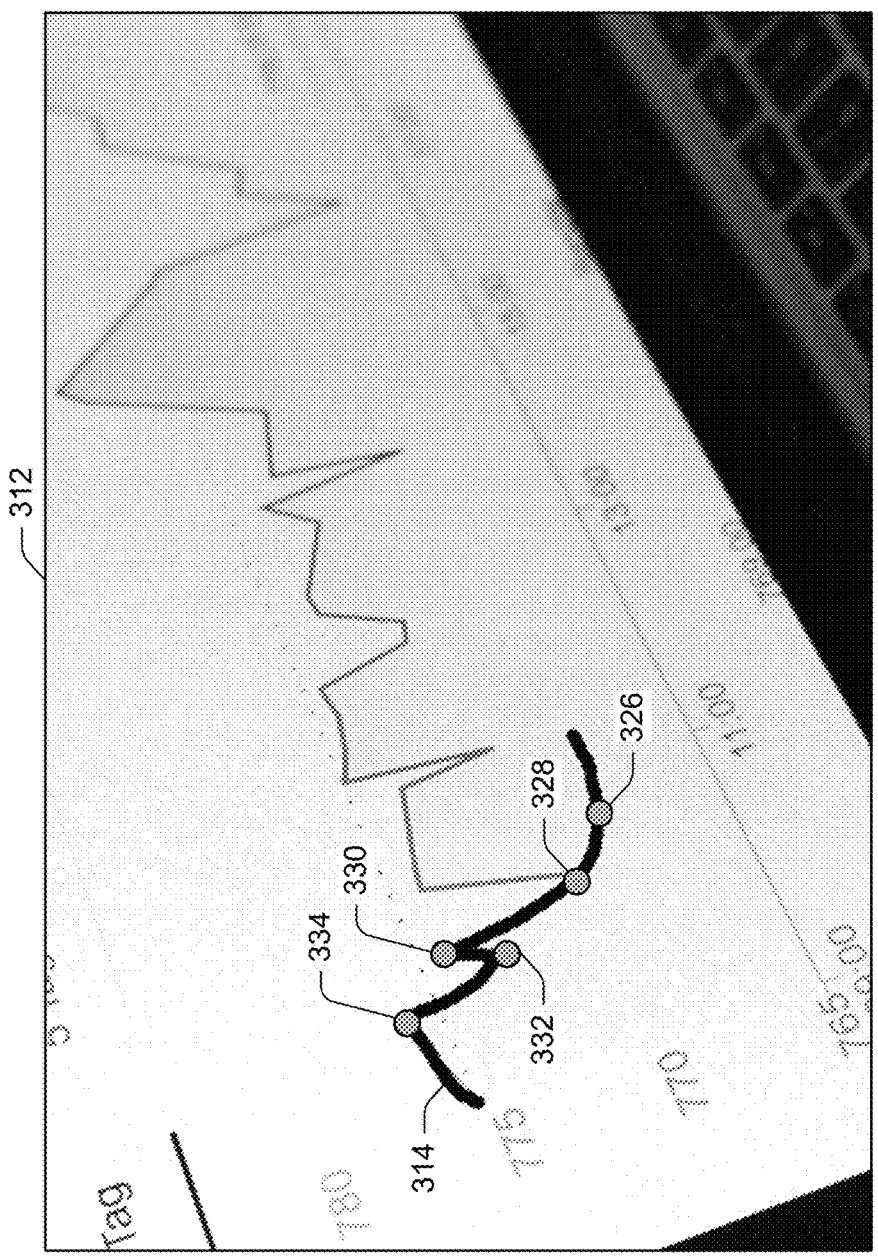

700

SYSTEMS FOR PARTIALLY UNDOING CONTENT EDITING OPERATIONS

BACKGROUND

Systems for creating and/or editing digital content receive user inputs from an input device that is manipulated to perform editing operations such as adding visual features to the digital content or removing visual features from the content. For example, a digital artist manipulates the input device to perform an editing operation that adds a stroke of digital paint along a border of an object depicted in the digital content. The system receives data describing the manipulation of the input device and processes the data to render the stroke of digital paint in a user interface.

A majority of the rendered stroke of digital paint follows the border of the object as the artist intended; however, a small portion of the stroke deviates from the border and obscures a portion of the object which is unacceptable to the digital artist. In conventional systems, the artist interacts with the input device to generate data describing an undo request for the editing operation. In response to receiving the data describing the request, the system removes the entire stroke of digital paint from the digital content. The digital artist must now reproduce the entire stroke of digital paint along the border of the object including the majority of the previously rendered stroke that followed the border as intended which is time consuming and inefficient.

SUMMARY

Techniques and systems are described for partially undoing content editing operations. In an example, a computing device implements an undo system to receive editing data describing coordinates of an editing operation performed relative to digital content rendered in a user interface of a display device. The undo system determines at least one coordinate of the editing operation between a starting coordinate and an ending coordinate of the editing operation.

For example, the undo system determines the at least one coordinate based on a duration of the editing operation, a length or size of the editing operation, characteristics of an input device manipulated to perform the editing operation, and so forth. The undo system receives input data describing a request to partially undo the editing operation. In response to receiving the input data, the undo system undoes a portion of the editing operation performed between the at least one coordinate and the ending coordinate of the editing operation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, 3C, 3D, and 3E illustrate an example of partially undoing a content editing operation.

DETAILED DESCRIPTION

Overview

Figure 1:
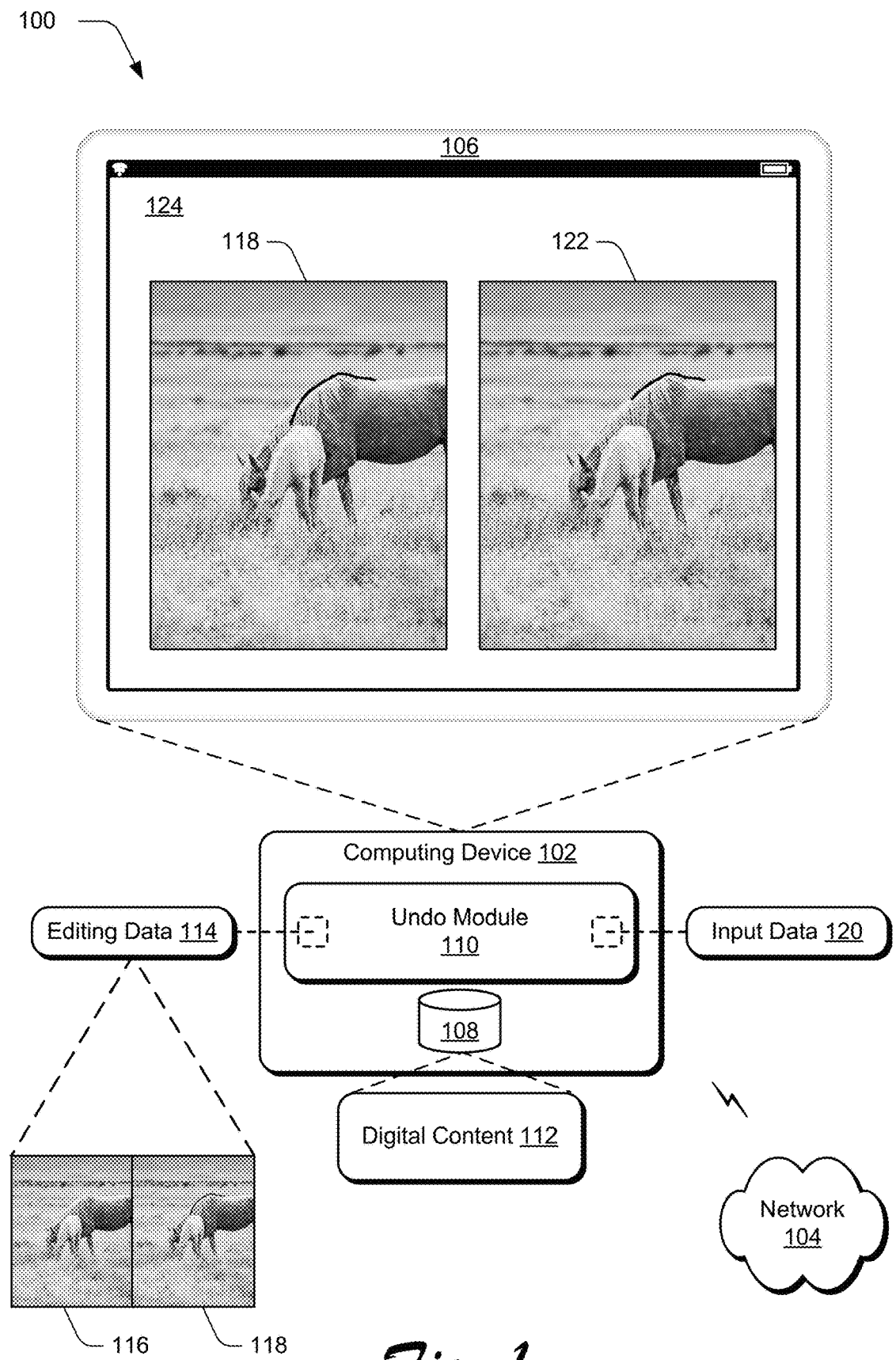
FIG. 1 is an illustration of an environment in an example implementation that is operable to employ digital systems and techniques for partially undoing content editing operations as described herein.

Conventional systems for creating and editing digital content are capable of undoing and redoing editing operations performed relative to the digital content. However, conventional systems are limited to undoing an entire editing operation. This is the case even in scenarios in which only a small portion of the entire editing operation is undesirable while a large portion of the editing operation is performed as intended. Because conventional systems are limited in this way, undoing the entire editing operation to correct the small portion that is undesirable requires reproduction of the large portion that was performed as intended which is time consuming and inefficient.

In order to overcome the limitations of conventional systems, techniques and systems are described for partially undoing content editing operations. In one example, a computing device implements an undo system to receive editing data describing coordinates of an editing operation performed relative to digital content rendered in a user interface of a display device. For example, the editing operation adds a visual feature to the digital content such as a stroke of digital paint, a graphic element, and so forth. In another example, the editing operation removes a visual feature from the digital content such as erasing the visual feature.

For example, the undo system determines a subset of the coordinates of the editing operation between a starting coordinate and an ending coordinate of the editing operation. In an example, the undo system determines the subset of the coordinates by generating a curve that approximates the editing operation. In some examples, the undo system generates the curve using regression to fit the curve to the coordinates of the editing operation. The undo system then determines local minimums and maximums of the curve and includes coordinates of the editing operation that correspond to the local minimums and maximums in the subset of the coordinates.

In another example, the undo system determines the subset of the coordinates based on data describing an input device which is manipulated to perform the editing operation. The input device is a stylus, a mouse, a keyboard, a microphone, etc. In this example, the undo system receives velocity data describing velocities of the input device as the device is manipulated. The undo system compares the velocities described by the velocity data with a threshold velocity. For example, the undo system includes coordinates of the curve/editing operation in the subset of the coordinates that correspond to velocities that are below the threshold velocity. In one example, the undo system includes coordinates of the curve/editing operation in the subset of the coordinates that correspond to velocities which are above the threshold velocity.

Consider an example in which the undo system receives pressure data describing pressures applied by the input device as the device is manipulated to perform the editing operation. In this example, the undo system compares pressures described by the pressure data with a threshold pressure. For example, the undo system includes coordinates of the curve/editing operation in the subset of the coordinates that correspond to pressures that are below the threshold pressure. In an example, the undo system includes coordinates of the curve/editing operation in the subset of the coordinates that correspond to pressures that are above the threshold pressure.

Consider another example in which the undo system leverages a sliding temporal or spatial window and the curve to determine the subset of the coordinates. In this example, the sliding window segments a portion of the curve within the window from the remaining portions of the curve. The undo system determines a coordinate which corresponds to a minimum velocity of the input device as the device is manipulated to perform a portion of the editing operation corresponding to the portion of the curve segmented within the sliding window. The undo system includes this coordinate in the subset of the coordinates in one example. In another example, the undo system includes a coordinate in the subset of the coordinates that corresponds to a maximum velocity of the input device as the device is manipulated to perform the portion of the editing operation corresponding to the segmented portion of the curve.

In an additional or an alternative example which leverages the sliding temporal or spatial window, the undo system determines a coordinate that corresponds to a minimum pressure applied by the input device as the device is manipulated to perform the portion of the editing operation corresponding to the portion of the curve within the sliding window. The undo system includes the determined coordinate in the subset of the coordinates in this example. For example, the undo system determines a coordinate that corresponds to a maximum pressure applied by the input device as the device is manipulated to perform the portion of the editing operation and the undo system includes this coordinate in the subset of the coordinates.

In some examples, the undo system removes a portion of the coordinates that are included in the subset from the subset. For example, the undo system processes coordinates included in the subset along the curve from left to right with a left most coordinate defined as a current coordinate. The undo system identifies an adjacent coordinate to the current coordinate and determines a distance between the current coordinate and the adjacent coordinate. If the determined distance is less than a threshold distance, then the undo system removes the adjacent coordinate from the subset of the coordinates and identifies a next adjacent coordinate. A distance between the next adjacent coordinate and the current coordinate is compared to the threshold distance in a similar manner.

If the determined distance is not less than the threshold distance, then the adjacent coordinate is defined as a new current coordinate. The undo system identifies a new coordinate that is adjacent to the new current coordinate and compares a distance between the new coordinate and the new current coordinate to the threshold distance. The undo system repeats this process until all of the coordinates included in the subset have been processed in this manner.

For example, the undo system receives input data describing a request to partially undo the editing operation. In response to receiving the input data, the undo system undoes a portion of the editing operation based on the subset of the coordinates. In another example, the undo system represents the coordinates included in the subset of coordinates as user interface elements and displays these user interface elements relative to the editing operation. In this example, the user interacts with the input device to indicate a selection of a particular one of the user interface elements. In response to receiving input data describing the particular one of the user interface elements, the undo system undoes a portion of the editing operation performed between a coordinate corresponding to the particular one of the user interface elements and the ending coordinate of the editing operation.

In other examples, the undo system generates and displays an adjustable user interface element which includes a range of values which are selectable via interaction with a slider portion of the adjustable user interface element. In these other examples, the undo system maps the ending coordinate of the editing operation to a minimum value of the range and maps the starting coordinate of the editing operation to a maximum value of the range. The undo system maps the coordinates of the editing operation between the starting and ending coordinates to values of the range between the minimum value and the maximum value based on a temporal metric, a spatial metric, etc. For example, temporal metric maps the coordinates to the values based on a duration of the editing operation and the spatial metric maps the coordinates to the values based on a size or a length of the editing operation.

The described systems improve digital content editing technology relative to conventional systems which are not capable of undoing a portion of an editing operation. Rather, conventional systems are limited to undoing an entire editing operation. As a result, editing operations performed using conventional systems which include a desirable portion and an undesirable portion must be undone entirely and the desirable portion must be reperformed in order to correct the undesirable portion. Unlike conventional systems, the described systems are capable of undoing portions of editing operations such that only undesirable portions of an editing operation are undone while any desirable portions of the editing operation are maintained and do not need to be reproduced as in the conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and an undo module 110. The storage device 108 is illustrated to include digital content 112.

The undo module 110 is illustrated as having, receiving, and/or transmitting editing data 114 that describes an example of the digital content 112. In this example, the editing data 114 describes a digital image 116. As shown, the digital image 116 depicts a smaller light-colored horse and a larger dark-colored horse grazing in a meadow. The editing data 114 also describes coordinates of a content editing operation performed relative to the digital image 116. This is illustrated as an edited digital image 118. The edited digital image 118 is identical to the digital image 116 except for an addition of a graphical element to the edited digital image 118 such as a stroke of digital paint.

For example, a user interacts with an input device (e.g., a mouse, a keyboard, a microphone, a stylus, etc.) using an application for creating and/or editing digital content to perform a content editing operation on the digital image 116. In this example, the input device is communicatively coupled to the computing device 102 via a wired or wireless connection. The computing device 102 receives data from the input device and processes the data to render editing operations relative to the digital image 116 which correspond to the user's interactions with the input device.

As shown in the edited digital image 118, the user has interacted with the input device and attempted to add a single stroke of digital paint along a dorsal portion of the dark-colored horse. However, the user unintentionally deviated from the dorsal portion near an end of the stroke of digital paint while interacting with the input device. Consider an example in which the editing operation performed on the edited digital image 118 is a single stroke and in conventional systems for creating and/or editing digital content, the user is forced to undo the entire stroke of digital paint. In this example using conventional techniques, the user must reproduce the entire editing operation including a portion performed before the deviation from the dorsal portion of the dark-colored horse.

In the illustrated example, the editing data 114 also describes coordinates of the editing operation performed on the edited digital image 118. For example, the undo module 110 receives the editing data 114 and processes the editing data 114 to determine at least one coordinate between a starting coordinate of the editing operation and an ending coordinate of the editing operation. The undo module 110 also receives input data 120 describing a request to partially undo the editing operation. For example, the user interacts with the input device to generate the input data 120.

The undo module 110 processes the input data 120 and undoes a portion of the editing operation performed between the at least one coordinate and the ending coordinate of the editing operation. This partially undone editing operation is depicted in a reedited digital image 122 which is displayed in a user interface 124 of the display device 106 along with the edited digital image 118. As shown, the reedited digital image 122 depicts a portion of the stroke of digital paint along the dorsal portion of the dark-colored horse but the portion of the stroke which deviated from the dorsal portion has been undone. In this manner, the user interacts with the input device to continue tracing the dorsal portion of the dark-colored horse without having to redo the entire editing operation.

In another example, the undo module 110 determines multiple coordinates between the starting coordinate of the editing operation and the ending coordinate of the editing operation. In this example, the undo module 110 displays indications of these multiple coordinates as user interface elements relative to the edited digital image 118. The user interacts with the input device to indicate a selection of a particular one of the user interface elements which corresponds to a particular coordinate of the multiple coordinates. The input data 120 describes the selection of the particular one of the user interface elements. In response to receiving the input data 120, the undo module 110 undoes a portion of the editing operation performed between the particular coordinate and the ending coordinate of the editing operation.

Consider an example in which the undo module 110 determines the multiple coordinates based on a temporal undo metric. In this example, the undo module 110 determines the multiple coordinates based on a duration of the editing operation. For example, the undo module 110 determines the multiple coordinates by determining a total duration of the editing operation, dividing the total duration into equal increments, and determining one of the multiple coordinates as corresponding to each of the equal increments. In another example, the undo module 110 does not divide the total duration into equal increments and instead determines the multiple coordinates based on weighted increments. In this example, the undo module 110 determines more of the multiple coordinates near the ending coordinate of the editing operation than near the starting coordinate of the editing operation.

For example, the undo module 110 determines the multiple coordinates based on a spatial undo metric. In this example, the undo module 110 computes a total distance between the starting coordinate of the editing operation and the ending coordinate of the operation and divides the total distance into equal partial distances. The undo module 110 determines each of the multiple coordinates as corresponding to one of the equal partial distance. However, in another example, the undo module 110 does not divide the total distance into equal partial distances and rather determines the multiple coordinates based on weighted partial distances. These weighted partial distances are assigned weights such that the undo module 110 determines more of the multiple coordinates near the ending coordinate of the editing operation than near the starting coordinate of the editing operation.

In other examples, the undo module 110 determines the multiple coordinates based at least partially on the input data 120. For example, the input data 120 describes a velocity of the input device as the user is performing the editing operation on the digital image 116. In an example in which the input device is a mouse, the velocity corresponds to a speed at which a cursor or other indicator moves as the stroke of digital paint is rendered in the edited digital image 118. In an example in which the input device is a stylus, the velocity corresponds to a speed at which the stylus moves relative to an interface as the stroke of digital paint is rendered in the edited digital image 118. For example, the undo module 110 determines the multiple coordinates as corresponding to velocities which are below a threshold velocity or above the threshold velocity.

In some examples, the input data 120 describes a pressure applied by the input device as the user interacts with the input device to edit the digital image 116. In the example in which the input device is a stylus, the pressure corresponds to a force applied by the stylus to the interface as the stroke of digital paint is rendered in the edited digital image 118. For example, the undo module 110 determines the multiple coordinates as corresponding to pressures which are below a threshold pressure or above the threshold pressure.

The undo module 110 partially undoes the editing operation without determining the multiple coordinates in some examples. In these examples, the undo module 110 generates and displays an adjustable user interface element such as a slider or a track bar which is adjustable within a range having a minimum value corresponding to the ending coordinate of the editing operation and a maximum value corresponding to the starting coordinate of the editing operation. The user interacts with an indicator of the adjustable user interface element and the undo module 110 gradually undoes the editing operation starting at the ending coordinate of the editing operation. For example, the undo module 110 completely undoes the editing operation if the indicator is adjusted to the maximum value of the range.

In one example in which the undo module 110 does not determine the multiple coordinates, the undo module 110 receives the input data 120 describing indications of positions along the stroke of digital paint. For example, the user interacts with the input device to specify a position along the stroke of digital paint. In response to receiving the input data 120 describing the position along the stroke of digital paint, the undo module 110 undoes a portion of the editing operation between the position and the ending coordinate of the editing operation. In another example, the user interacts with the input device to specify multiple positions along the stroke of digital paint. In this example, the undo module 110 undoes a portion of the editing operation between the multiple positions.

Figure 2:
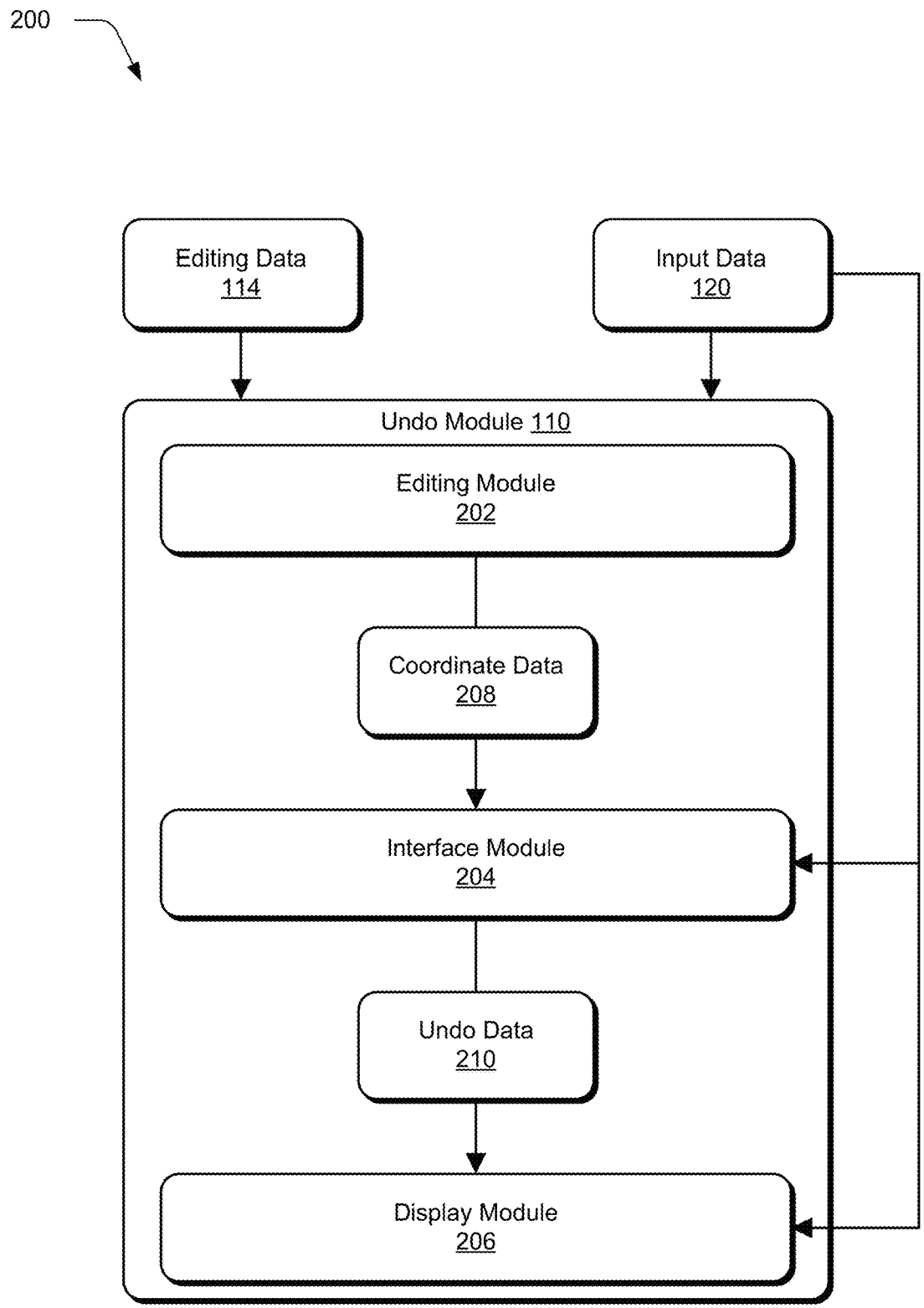
FIG. 2 depicts a system in an example implementation showing operation of an undo module for partially undoing content editing operations.

FIG. 2 depicts a system 200 in an example implementation showing operation of an undo module 110. The undo module 110 is illustrated to include an editing module 202, an interface module 204, and a display module 206. As shown, the undo module 110 receives the editing data 114 and the input data 120 as inputs. For example, the editing module 202 receives the editing data 114 and processes the editing data to generate coordinate data 208.

Figure 3A:
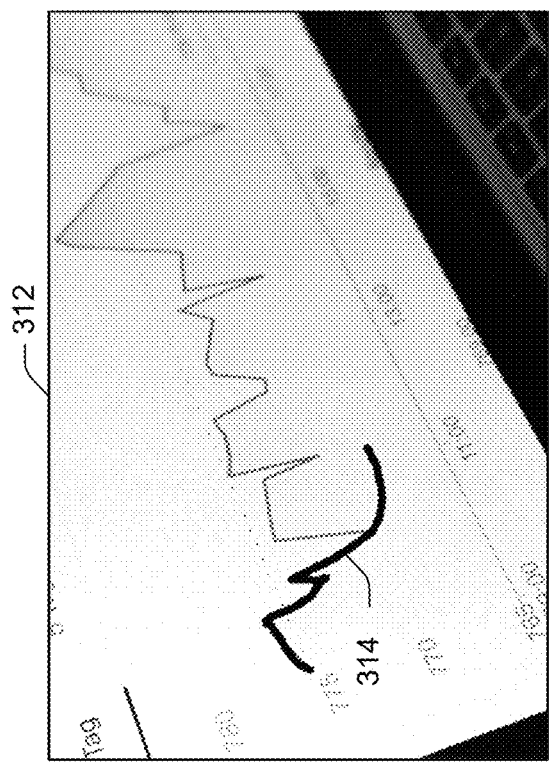
Figure 3A:
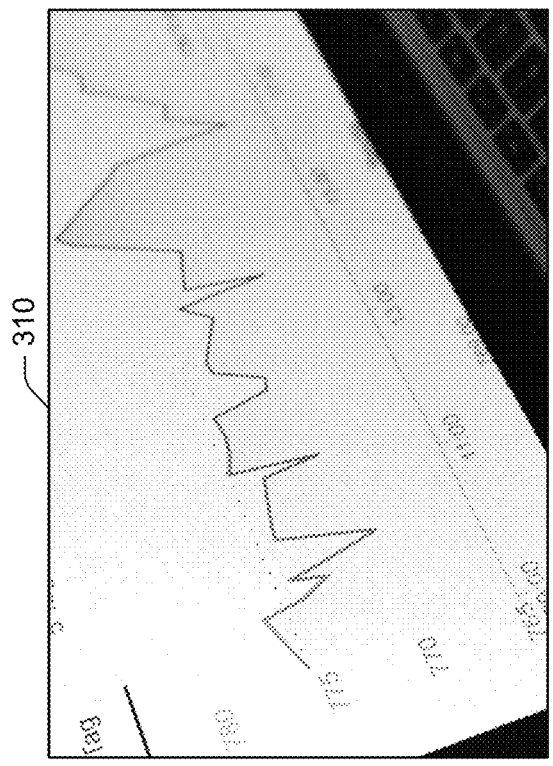
Figure 3B:
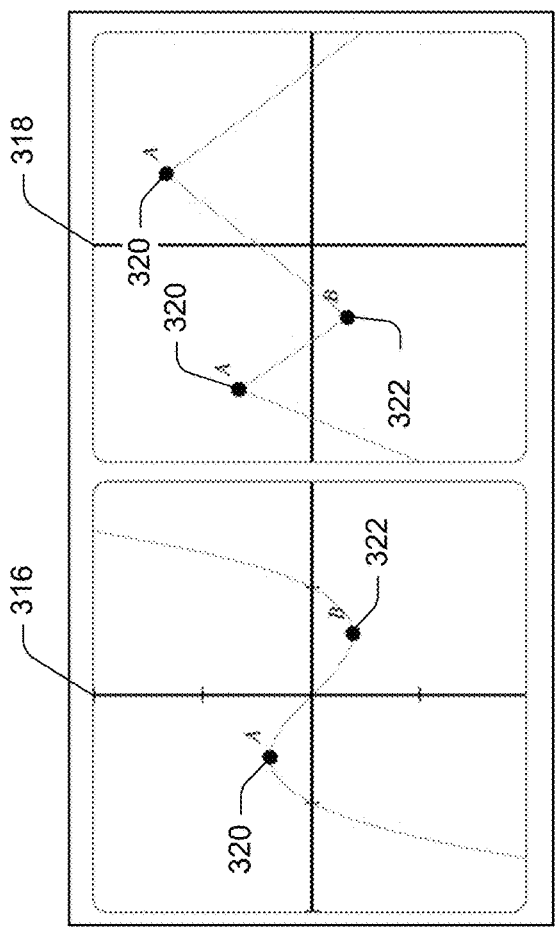
Figure 3B:
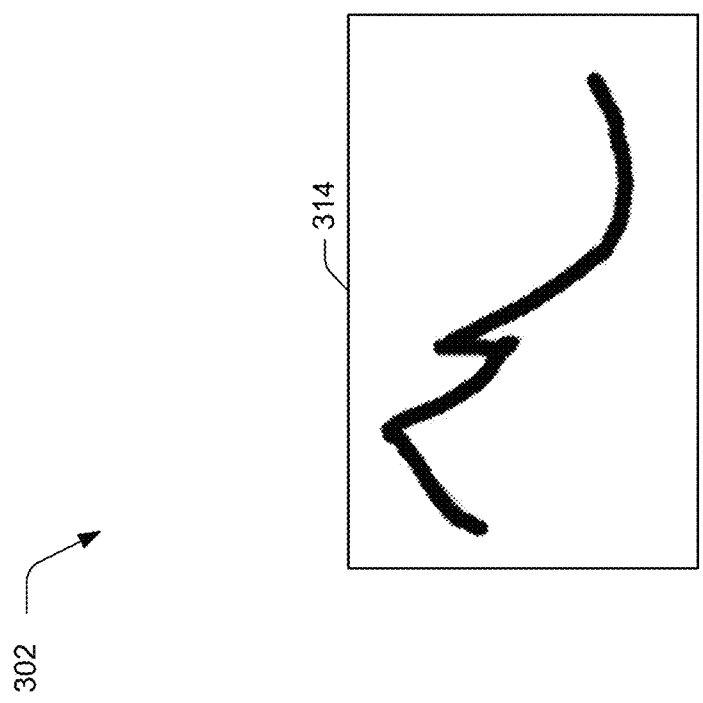

FIGS. 3A, 3B, 3C, 3D, and 3E illustrate an example of partially undoing a content editing operation. FIG. 3A illustrates a representation 300 of a digital content editing operation. FIG. 3B illustrates a representation 302 of generating a curve that approximates the digital content editing operation based on coordinates of the digital content editing operation. FIG. 3C illustrates a representation 304 of determining a subset of the coordinates of the digital content editing operation using a sliding window along the curve. FIG. 3D illustrates a representation 306 of displaying user interface elements along the digital content editing operation for partially undoing the digital content editing operation.

Figure 3E:
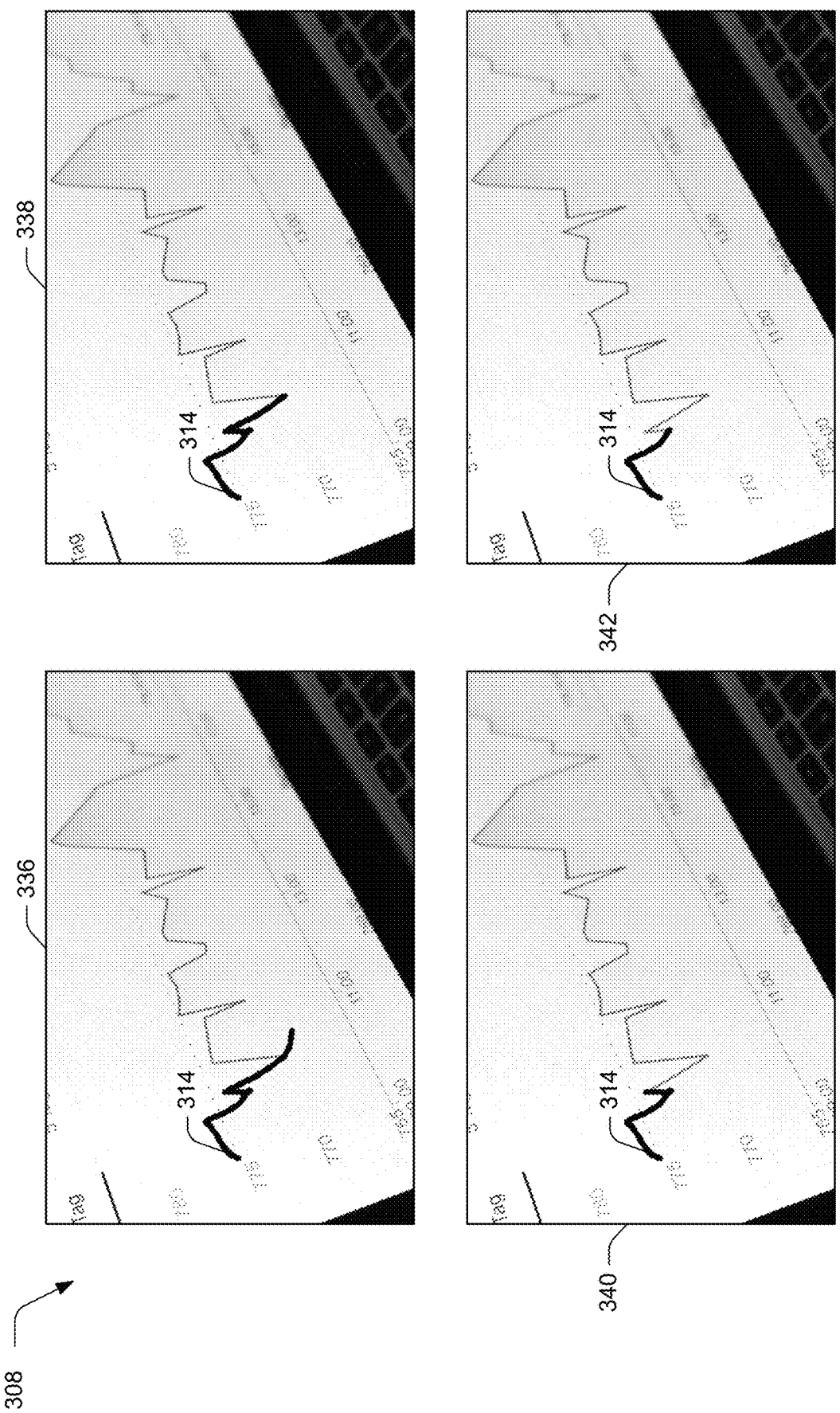

FIG. 3E illustrates a representation 308 of examples of partially undoing the digital content editing operation.

With reference to FIG. 3A, the editing module 202 receives the editing data 114 which describes a digital image 310 and an edited digital image 312. As shown, the digital image 310 depicts a portion of a line graph displayed on a portion of a display device of a computing device. For example, a user interacts with an input device and an application for creating and/or editing digital content to perform an editing operation 314 on the digital image 310 which is illustrated in the edited digital image 312. The user interacted with the input device and attempted to trace the line graph with a stroke of digital paint. The user was able to successfully trace a portion of the line graph; however, the editing operation 314 deviates from the line graph near an end of the editing operation 314.

In one example, the editing module 202 generates the coordinate data 208 as describing coordinates of the editing operation 314. For example, as the editing operation 314 is being rendered in the edited digital image 312, the editing module 202 extracts x-coordinates and y-coordinates corresponding to the rendered portions of the stroke of digital paint. In some examples, the editing module 202 also extracts additional information as the editing operation 314 is performed such as input device velocity data, input device pressure data, a duration of the editing operation 314, and so forth.

In an example illustrated in FIG. 3B, the editing module 202 extracts the coordinates of the editing operation 314 and generates a curve that approximates the editing operation 314. To do so in one example, the editing module runs a curve fitting algorithm on the coordinates of the editing operation 314 such as regression to fit a curve to the coordinates. The representation 302 includes a first example curve 316 and a second example curve 318. The first and second curves 316, 318 include local maximum points 320 and local minimum points 322. The editing module 202 indicates local maximum points and local minimum points on the curve generated to approximate the editing operation 314. The editing module 202 generates the coordinate data 208 describing the coordinates of the editing operation 314, the curve that approximates the editing operation 314, and local minimums and maximums of the curve that approximates the editing operation 314 in one example.

As shown in FIG. 2, the interface module 204 receives the coordinate data 208 and the input data 120 as inputs and processes the coordinate data 208 and the input data 120 to generate undo data 210. For example, the undo data 210 describes a subset of the coordinates of the editing operation 314. In one example, the interface module 204 includes coordinates of the curve that approximates the editing operation 314 which correspond to the local minimums and maximums of the curve within the subset of coordinates.

In an example illustrated in FIG. 3C, the interface module 204 determines the subset of the coordinates based on a sliding window 324 and the input data 120. As shown, the sliding window 324 segments a portion of the editing operation 314 within the sliding window 324 from other portions of the editing operation 314. For example, the sliding window 324 is defined temporally, spatially, etc. Within each position of the sliding window 324 the interface module 204 determines a coordinate which corresponds to a minimum velocity of the input device as the user manipulates the input device to perform a portion of the editing operation 314 included within the sliding window 324. In this example, the interface module 204 includes the determined coordinate in each position of the sliding window 324 in the subset of the coordinates.

In another example, the interface module 204 determines a coordinate within each position of the sliding window 324 which corresponds to a minimum pressure of the input device as the user manipulates the input device to perform a portion of the editing operation 314 included within the sliding window 324. In this other example, the interface module 204 includes the determined coordinate in each sliding window 324 in the subset of the coordinates. Consider an example in which the interface module 204 determines a coordinate in each of position of the sliding window 324 based on a velocity and a pressure of the input device. For example, the interface module 204 determines a score for each coordinate included in each position of the sliding window 324 that represents a sum of a velocity of the input device and a pressure of the input device corresponding to each coordinate included in the sliding window 324. The interface module determines a coordinate having a lowest score within each position of the sliding window 324 and includes these coordinates in the subset of the coordinates.

In some examples, the interface module 204 determines the subset of the coordinates based on the input data 120 and without using the sliding window 324. In these examples, the interface module 204 identifies each coordinate of the coordinates of the editing operation 314 which corresponds to a velocity of the input device which is below a threshold velocity and the interface module 204 includes the identified coordinates in the subset of the coordinates. For example, the interface module 204 identifies each coordinate of the coordinates of the editing operation which corresponds to a pressure of the input device which is below a threshold pressure and the interface module 204 includes the identified coordinates in the subset of the coordinates.

Consider an example in which the interface module 204 includes many coordinates in the subset of the coordinates. For example, the subset of the coordinates includes the coordinates corresponding to the local minimums and maximums of the curve that approximates the editing operation 314, the coordinates within each position of the sliding window 324 that correspond to minimum velocities and/or pressures of the input device, the coordinates corresponding to velocities of the input device below the threshold velocity, the coordinates corresponding to pressures of the input device below the threshold pressure, and so forth. In this example, the interface module 204 removes some of the coordinates from the subset of the coordinates.

To do so, the interface module 204 processes the coordinates of the editing operation 314 that are included in the subset of the coordinates based on the curve that approximates the editing operation 314. For example, the interface module 204 processes the coordinates included in the subset of the coordinates from left to right with a left most coordinated defined as a current coordinate. The interface module 204 determines a distance between the current coordinate and an adjacent coordinate and compares the determined distance with a threshold distance.

If the determined distance is less than the threshold distance, then the interface module 204 removes the adjacent coordinate from the subset of the coordinates. If the determined distance is not less than the threshold distance, then the interface module 204 defines the adjacent coordinate as a new current coordinate. In one example, the interface module 204 determines an additional distance between the new current coordinate and a new adjacent coordinate and compares the determined additional distance with the threshold distance. In this example, the interface module 204 repeats this process until all of the coordinates included in the subset of the coordinates have been processed.

Consider an example in which a particular coordinate of the editing operation 314 is included in the subset of the coordinates but the particular coordinate is not intersected by the curve that approximates the editing operation 324. In this example, the interface module 204 vertically projects the particular coordinate onto the curve to determine distances between the particular coordinate and other coordinates included in the subset for comparison with the threshold distance. For example, after the interface module 204 processes all of the coordinates in the subset of the coordinates, the interface module 204 generates the undo data 210 as describing the coordinates which remain in the subset of the coordinates.

As shown in FIG. 2, the display module 206 receives undo data 210 and the input data 120 and processes the undo data 210 and/or the input data 120 to generate user interface elements 326-334 which the display module 206 renders relative to the editing operation 314. With reference to FIG. 3D, each of the user interface elements 326-334 corresponds to a coordinate of the editing operation 314 described by the undo data 210 in one example. For example, the user interacts with the input device to indicate a selection of one of the user interface elements 326-334 which is described by the input data 120.

In a first example, the input data 120 describes a selection of user interface element 326. The display module 206 receives the input data 120 and processes the input data 120 to generate a first partially undone editing operation 336. As illustrated in FIG. 3E, the display module 206 generates the first partially undone editing operation 336 by undoing a portion of the editing operation 314 between the user interface element 326 and an ending coordinate of the editing operation 314. Although the first partially undone editing operation 336 has undone a portion of editing operation 314 that deviates from the line graph another portion of the deviation still remains.

In a second example, the input data 120 describes a selection of user interface element 328. In this example, the display module 206 receives the input data 120 and processes the input data 120 to generate a second partially undone editing operation 338. As shown, the editing operation 314 no longer deviates from the line graph in this example. For example, the user interacts with the input device and the application for creating and/or editing digital content to continue tracing the line graph using strokes of digital paint. This is not possible in conventional systems which are limited to completely undoing the editing operation 314.

In a third example, the input data 120 describes a selection of user interface element 330 and the display module 206 processes the input data 120 to generate a third partially undone editing operation 340. For example, the display module 206 generates the third partially undone editing operation 340 by undoing the portion of the editing operation 314 that deviates from the line graph and also undoing a portion of the editing operation 314 which does not deviate from the line graph. In one example, the user has undone more of the editing operation 314 than intended and the user interacts with the input device to indicate a request to redo the portion of the editing operation 314 that does not deviate from the line graph.

In a fourth example, the user interacts with the input device to indicate a selection of user interface element 332 and this selection is described by the input data 120. The display module 206 receives the input data 120 and processes the input data 120 to generate a fourth partially undone editing operation 342. As illustrated, the display module 206 generates the fourth partially undone editing operation 342 by undoing an additional portion of the editing operation 314 that does not deviate from the line graph. For example, the user interacts with the input device to indicate a request to redo the additional portion of the editing operation 314 that does not deviate from the line graph.

In another example, the display module 206 changes a location of any of the user interface elements 326-334 relative to the editing operation 314. Consider an example in which the user interface elements 326-334 are replaced with a single adjustable user interface element. The user interacts with the input device to generate input data 120 describing a relocation of the single adjustable user interface element to a position along the editing operation 314 corresponding to a start of the deviation of the editing operation 314 from the line graph. In this example, the user interacts with the input device to indicate a selection of the single adjustable user interface element in the position that corresponds to the start of the deviation. This causes generation of the input data 120 as describing the selection of the single adjustable user interface element. The display module 206 receives the input data 120 and processes the input data 120 to generate the second partially undone editing operation 338.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
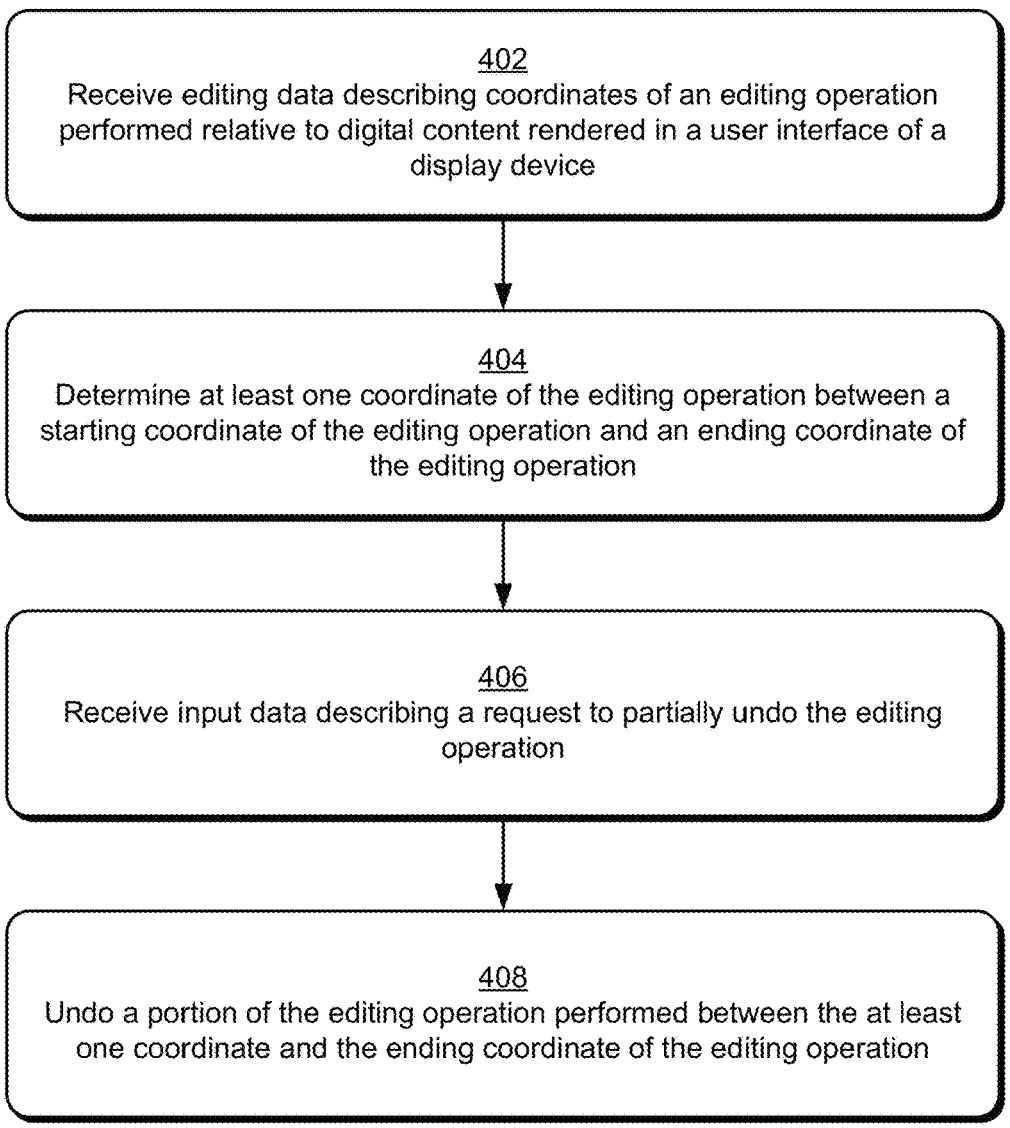
FIG. 4 is a flow diagram depicting a procedure in an example implementation in which editing data describing coordinates of an editing operation performed relative to digital content is received and a portion of the editing operation is undone.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which editing data describing coordinates of an editing operation performed relative to digital content is received and a portion of the editing operation is undone.

Editing data describing coordinates of an editing operation performed relative to digital content rendered in a user interface of a display device is received (block 402). The computing device 102 implements the undo module 110 to receive the editing data in one example. At least one coordinate of the editing operation between a starting coordinate of the editing operation and an ending coordinate of the editing operation is determined (block 404). For example, the undo module 110 determines the at least one coordinate.

Input data describing a request to partially undo the editing operation is received (block 406). In one example, the computing device 102 implements the undo module 110 to receive the input data. A portion of the editing operation performed between the at least one coordinate and the ending coordinate of the editing operation is undone (block 408). For example, the undo module 110 undoes the portion of the editing operation.

Figure 5A:
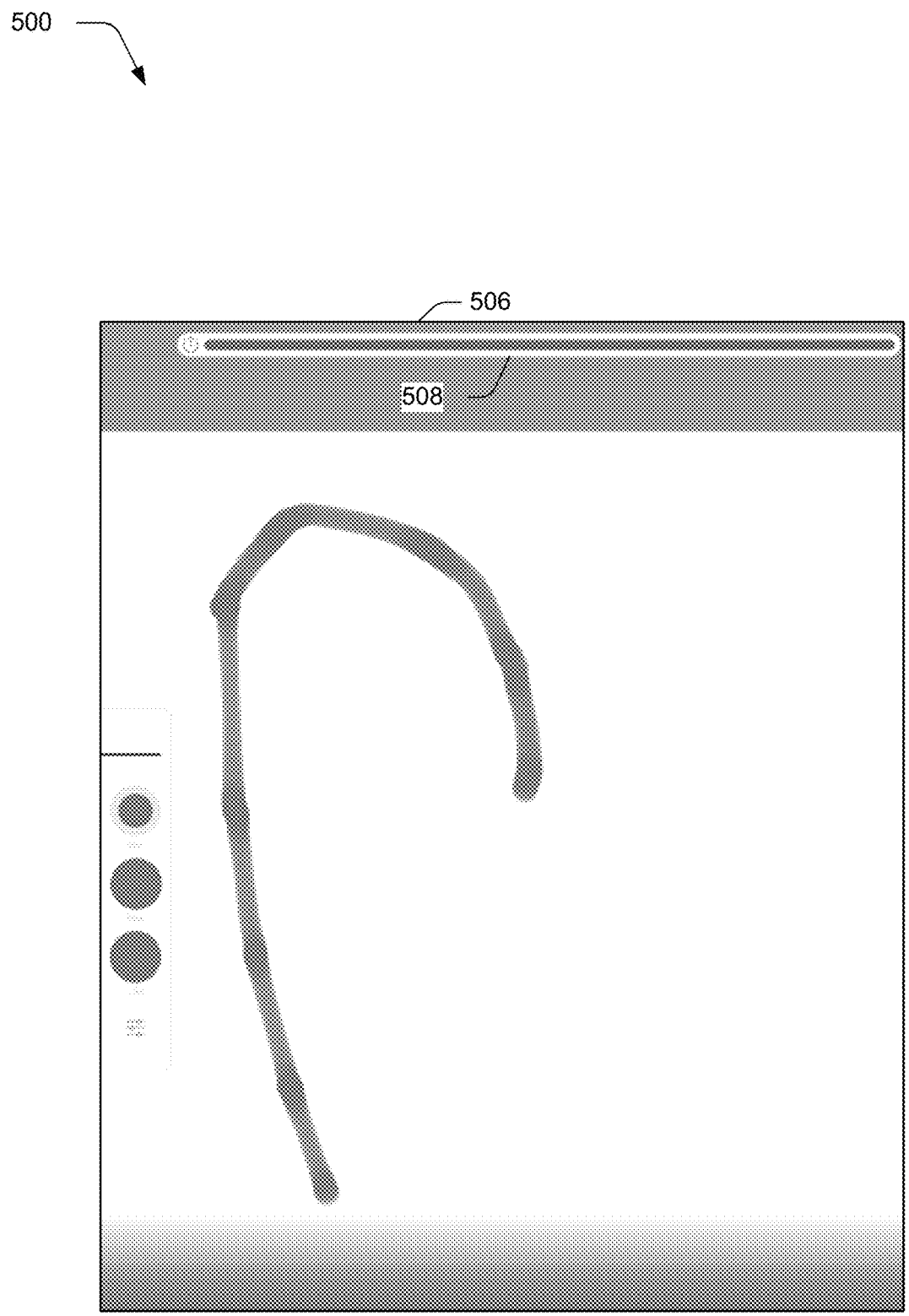
FIGS. 5A, 5B, and 5C illustrate an example of partially undoing a content editing operation based on a temporal undo metric.
Figure 5B:
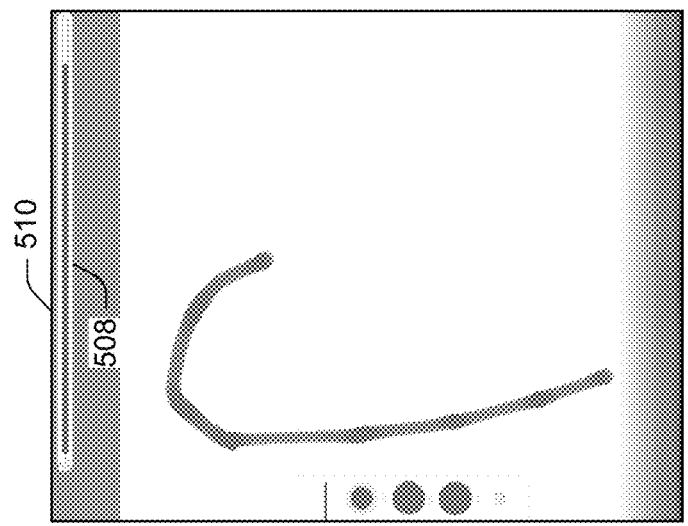
Figure 5B:
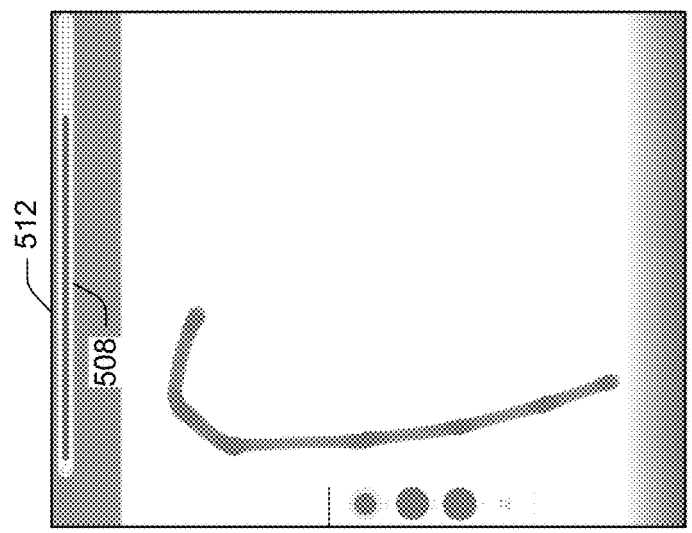
Figure 5B:
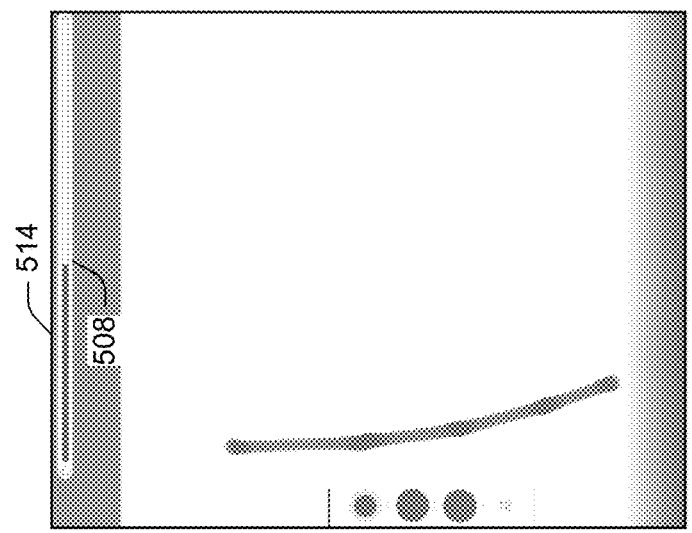
Figure 5C:
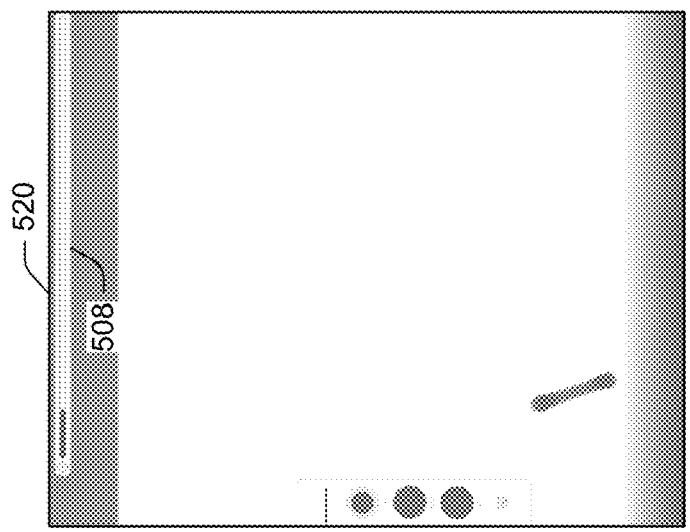
Figure 5C:
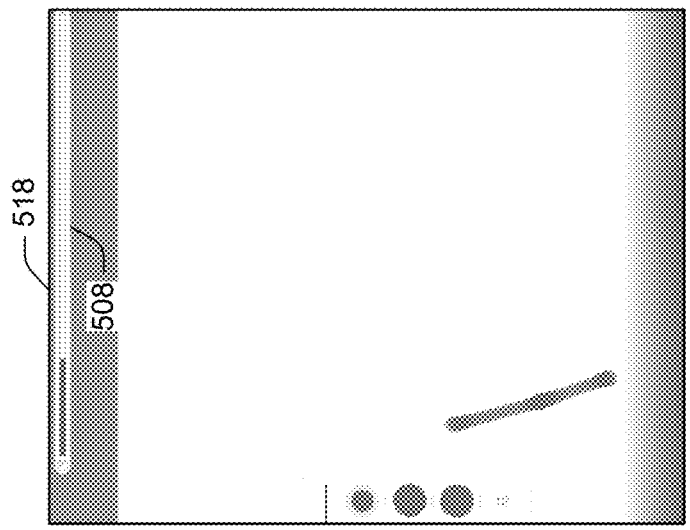
Figure 5C:
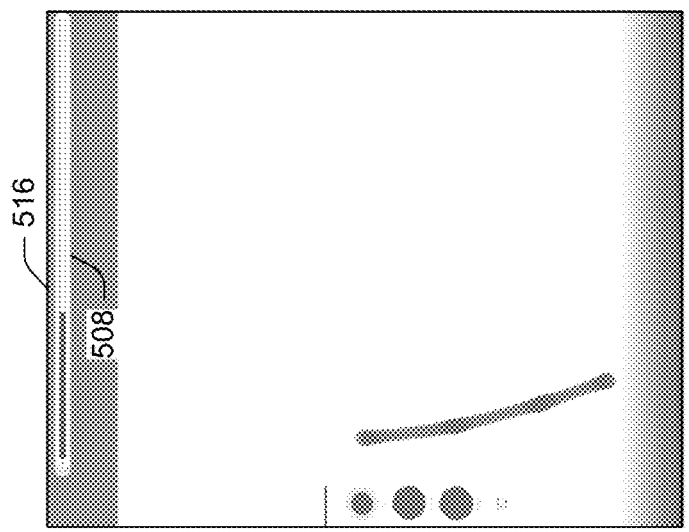

FIGS. 5A, 5B, and 5C illustrate an example of partially undoing a content editing operation based on a temporal undo metric. FIG. 5A illustrates a representation 500 of a user interface for partially undoing the content editing operation. FIG. 5B illustrates a representation 502 of a first group of partially undone content editing operations. FIG. 5C illustrates a representation 504 of a second group of partially undone content editing operations.

As shown in FIG. 5A, the representations 500 includes a complete stroke of digital paint 506 which is rendered in a user interface that includes an adjustable user interface element 508. For example, a user interacts with an input device (e.g., a mouse, a keyboard, a microphone, a stylus, etc.) using an application for creating and/or editing digital content to digitally draw or paint the complete stroke of digital paint 506 relative to a digital canvas. In the illustrated example, the complete stroke of digital paint 506 is a single complete editing operation.

In an example in which the input device is a stylus, the user causes the stylus to contact an interface and moves the stylus relative to the interface while the stylus contacts the interface to paint or draw portions of the complete stroke of digital paint 506. In this example, the user then raises the stylus from the interface to finish drawing or painting the complete stroke of digital paint 506. In an example in which the input device is a mouse, the user engages an actuatable portion of the mouse (e.g., presses a mouse button) and moves the mouse relative to a mouse pad while the actuatable portion of the mouse is engaged to paint or draw portions of the complete stroke of digital paint 506. For example, the user then disengages the actuatable portion of the mouse (e.g., releases a mouse button) to finish drawing or painting the complete stroke of digital paint 506.

The undo module 110 receives editing data 114 describing coordinates of the complete stroke of digital paint 506 and processes the editing data 114 to determine a subset of the coordinates of the complete stroke of digital paint 506. In one example, the undo module 110 determines the subset of the coordinates based on the sliding window 324 and the input data 120. In this example, the undo module 110 includes coordinates in the subset of the coordinates that correspond to a minimum velocity of the input device and/or a minimum pressure applied by the input device as the user drew or painted a portion of the complete stroke of digital paint 506 included in the sliding window 324.

In another example, the undo module 110 determines the subset of coordinates based on a duration of the user's interaction with the input device to paint or draw the complete stroke of digital paint 506. In this example, the undo module 110 determines coordinates to include in the subset of coordinates that correspond to fractions of the duration of the user's interaction with the input device. For example, if this duration is two seconds, then the undo module 110 determines a coordinate to include in the subset every one third of a second as a temporal undo metric. In one example, the undo module 110 maps the subset of the coordinates to a range of values of the adjustable user interface element 508.

As illustrated in FIG. 5B, the representation 502 includes a first partially undone editing operation 510. For example, the user interacts with the input device to specify a first value in the range of values of the adjustable user interface element 508 and the undo module 110 receives the input data 120 describing the first value. The undo module 110 processes the input data 120 and/or the editing data 114 to identify a first coordinate included in the subset of the coordinates that corresponds to the first value in the range of values. The undo module 110 undoes a portion of the complete stroke of digital paint 506 between the first coordinate and an end portion of the complete stroke of digital paint 506 which is illustrated as the first partially undone editing operation 510.

The user interacts with the input device relative to the first partially undone editing operation 510 and specifies a second value in the range of values of the adjustable user interface element 508. For example, the undo module 110 receives the input data 120 which describes the second value and the undo module 110 processes the input data 120 and/or the editing data 114 to identify a second coordinate included in the subset of the coordinates which corresponds to the second value. The undo module 110 undoes a portion of first partially undone editing operation 510 between the second coordinate and an end portion of the first partially undone editing operation 510 which is illustrated as a second partially undone editing operation 512.

For example, the user interacts with the input device relative to the second partially undone editing operation 512 and indicates a third value in the range of values of the adjustable user interface element 508. In this example, the undo module 110 receives the input data 120 which describes the third value and the undo module 110 processes the input data 120 and/or the editing data 114 to identify a third coordinate included in the subset of coordinates that corresponds to the third value in the range of values. Once this third coordinate is identified, the undo module 110 undoes a portion of the second partially undone editing operation 512 between the third coordinate and an end portion of the second partially undone editing operation 512. This is shown as a third partially undone editing operation 514.

As in the previous examples and with respect to FIG. 5C, the user specifies a fourth value in the range of values of the adjustable interface element 508. Responsive to receiving the input data 120 describing the fourth value, the undo module 110 undoes a portion of the third partially undone editing operation 514 between an identified fourth coordinate included in the subset of the coordinates and an end portion of the third partially undone editing operation 514 which is illustrated as a fourth partially undone editing operation 516. For example, the identified fourth coordinate corresponds to the fourth value. The user interacts with the input device relative to the fourth partially undone editing operation 516 and specifies a fifth value in the range of values of the adjustable interface element 508. The undo module 110 receives the input data 120 that describes the fifth value and identifies a fifth coordinate included in the subset of the coordinates that corresponds to the fifth value.

For example, the undo module 110 undoes a portion of the fourth partially undone editing operation 516 between the fifth coordinate and an end portion of the fourth partially undone editing operation 516 which is shown as a fifth partially undone editing operation 518. The user then specifies a sixth value in the range of values of the adjustable interface element 508. In response to receiving the input data 120 describing the sixth value, the undo module 110 undoes a portion of the fifth partially undone editing operation 518 between an identified sixth coordinate included in the subset of the coordinates and an end portion of the fifth partially undone editing operation 518. For example, the sixth coordinate corresponds to the sixth value. A result of this partial undoing is illustrated as a sixth partially undone editing operation 520.

Figure 6:
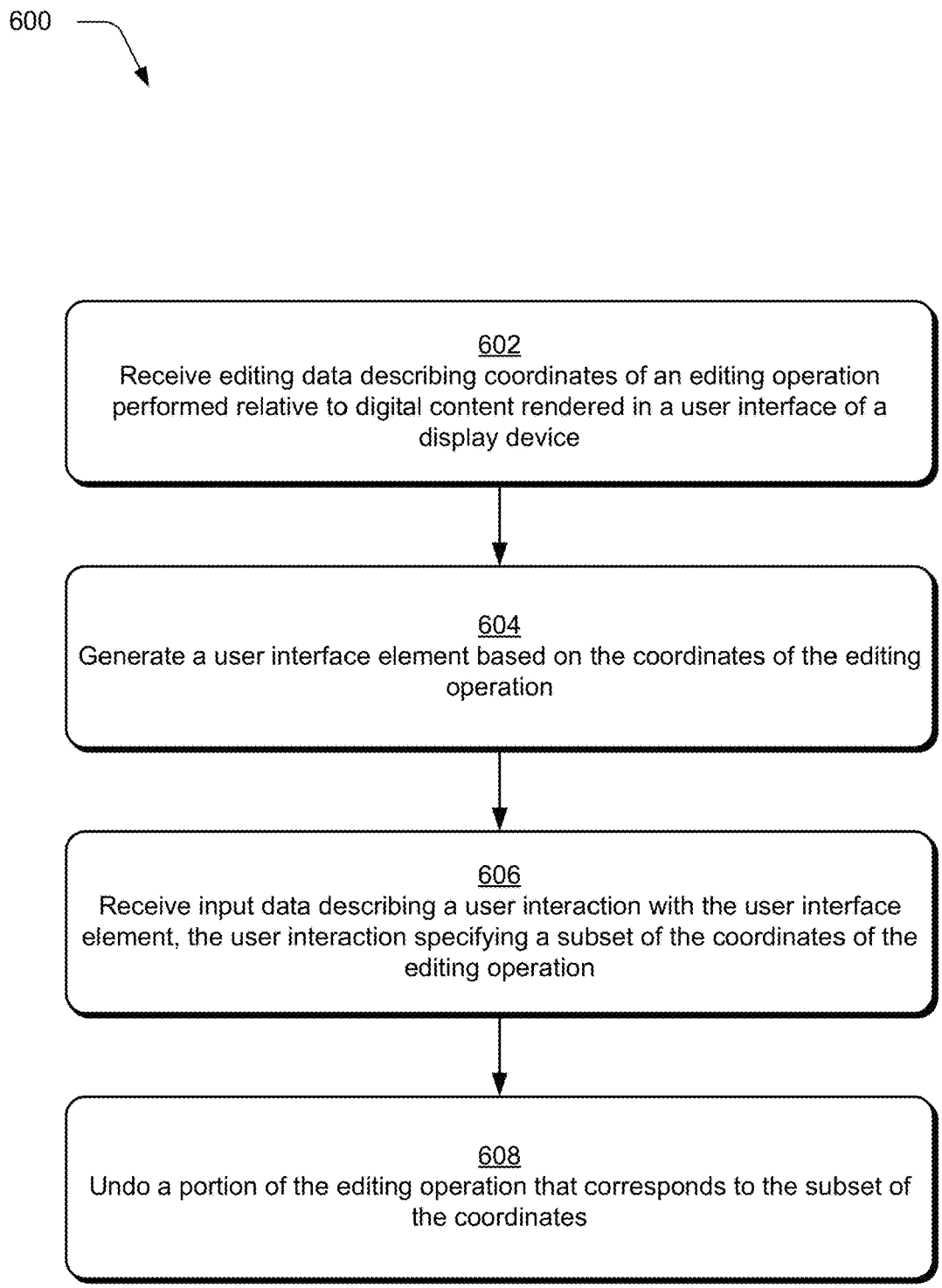
FIG. 6 is a flow diagram depicting a procedure in an example implementation in which editing data describing coordinates of an editing operation performed relative to digital content is received and a portion of the editing operation is undone that corresponds to a subset of the coordinates.

FIG. 6 is a flow diagram depicting a procedure 600 in an example implementation in which editing data describing coordinates of an editing operation performed relative to digital content is received and a portion of the editing operation is undone that corresponds to a subset of the coordinates. Editing data describing coordinates of an editing operation performed relative to digital content rendered in a user interface of a display device is received (block 602). In one example, the computing device 102 implements the undo module 110 to receive the editing data.

A user interface element is generated (block 604) based on the coordinates of the editing operation. The undo module 110 generates the user interface element in one example. Input data describing a user interaction with the user interface element is received (block 606), the user interaction specifying a subset of the coordinates of the editing operation. For example, the computing device 102 implements the undo module 110 to receive the input data. A portion of the editing operation that corresponds to the subset of the coordinates is undone (block 608). The undo module 110 undoes the portion of the editing operation that corresponds to the subset of the coordinates in some examples.

Figure 7A:
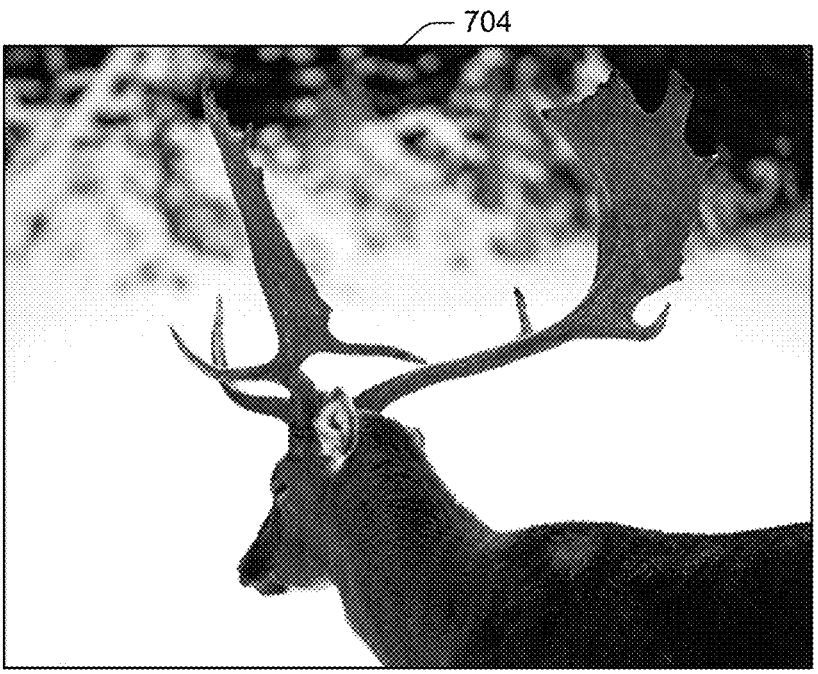
FIGS. 7A and 7B illustrate an example of partially undoing a content editing operation based on a spatial undo metric.
Figure 7A:
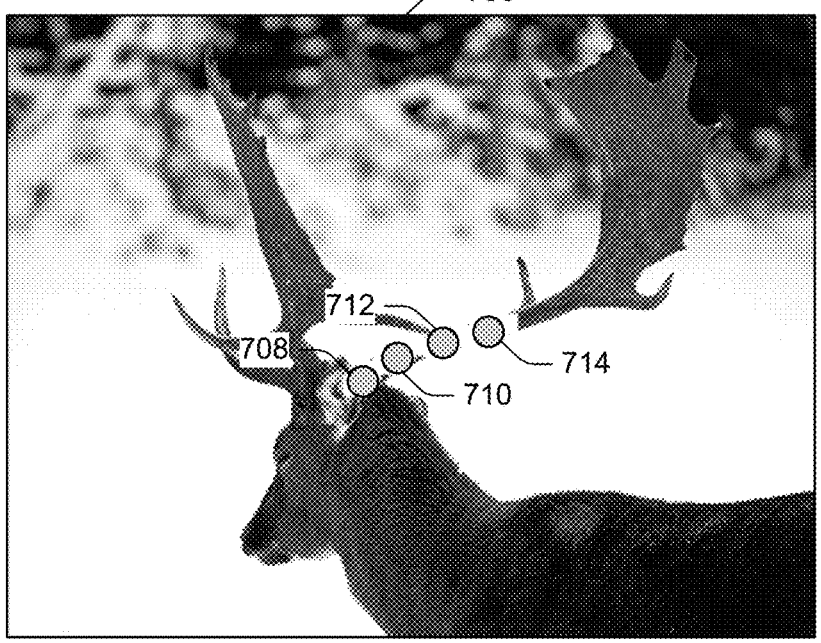
Figure 7B:
Figure 7B:
Figure 7B:

FIGS. 7A and 7B illustrate an example of partially undoing a content editing operation based on a spatial undo metric. FIG. 7A illustrates a representation 700 of the content editing operation. FIG. 7B illustrates a representation 702 of partially undone content editing operations. As shown in FIG. 7A, the representation 700 includes a digital image 704 and an edited digital image 706. The digital image 704 depicts a deer standing in a snow-covered forest. For example, a user interacts with an input device using an application for creating and/or editing digital content to perform an editing operation on the digital image 704 which is illustrated in the edited digital image 706. In this example, the editing operation is a removal of a portion of the digital image 704 such as an erasing operation.

The user has attempted to erase a portion of the deer's right antler and has unintentionally erased a portion of the deer's head. The undo module 110 receives the editing data 114 which describes coordinates of the editing operation illustrated in the edited digital image 706. In one example, the undo module 110 processes the editing data 114 to determine a distance between a starting coordinate of the editing operation and an ending coordinate of the editing operation. In an example in which the computing device 102 implements the undo module 110 to partially undo the editing operation based on a spatial metric, the undo module 110 generates and displays user interface elements 708-714 relative to the edited digital image 706. For example, the undo module 110 displays the user interface elements 708-714 separated by equal distances along the editing operation.

In some examples, the undo module 110 generates and displays the user interface elements 708-714 separated by different distances along the editing operation such that more of the user interface elements 708-714 are near the ending coordinate of the editing operation than are near the starting coordinate of the editing operation. This is because an unintentionally performed portion of the editing operation is more likely to occur near the end of the editing operation as the user notices the unintentionally removed portion of the deer's head and then stops performing the editing operation. By disposing more of the user interface elements 708-714 near the unintentionally performed portion of the editing operation, for example, the user has greater flexibility in partially undoing the unintentionally performed portion.

The user interacts with the input device to indicate a selection of user interface element 708 which generates input data 120 describing the selection of the user interface element 708. The undo module 110 receives the input data 120 and processes the input data 120 and/or the editing data 114 to partially undo the editing operation illustrated in the edited digital image 706. For example, the undo module 110 undoes a portion of the editing operation performed between the user interface element 708 and the ending coordinate of the editing operation. This is illustrated as a first partially undone editing operation 716.

As shown in FIG. 7B, the first partially undone editing operation 716 has undone the unintentionally performed portion of the editing operation. For example, a remaining portion of the editing operation no longer removes a portion of the deer's head and only removes a portion of the deer's right antler. In one example, the user is satisfied that the unintentionally performed portion of the editing operation has been undone. In another example, the user interacts with the input device the indicate a selection of user interface element 710. In this example, the undo module 110 receives the input data 120 which describes the selection of the user interface element 710 and the undo module processes the input data 120 and/or the editing data 114 to partially undo another portion of the editing operation.

For example, the undo module 110 undoes a portion of the editing operation performed between the user interface element 710 and an end portion of the first partially undone editing operation 716. This is illustrated as a second partially undone editing operation 718. In an example, the user prefers the first partially undone editing operation 716 over the second partially undone editing operation 718. In this example, the user interacts with the input device to generate the input data 120 describing a request to redo the undone portion of the editing operation performed between the user interface element 710 and the end portion of the first partially undone editing operation 716. The undo module 110 receives the input data 120 and process the input data 120 and/or the editing data 114 to redo this undone portion of the editing operation.

In another example, the user interacts with the input device to indicate a selection of user interface element 712. In this example, the undo module 110 receives the input data 120 which describes the selection of the user interface element 712. The undo module processes the input data 120 and/or the editing data 114 to undo a portion of the editing operation performed between the user interface element 712 and an end portion of the second partially undone editing operation 718. This is shown as a third partially undone editing operation 720. As illustrated in the third partially undone editing operation 720, only a small portion of the deer's right antler is removed.

Example System and Device

Figure 8:
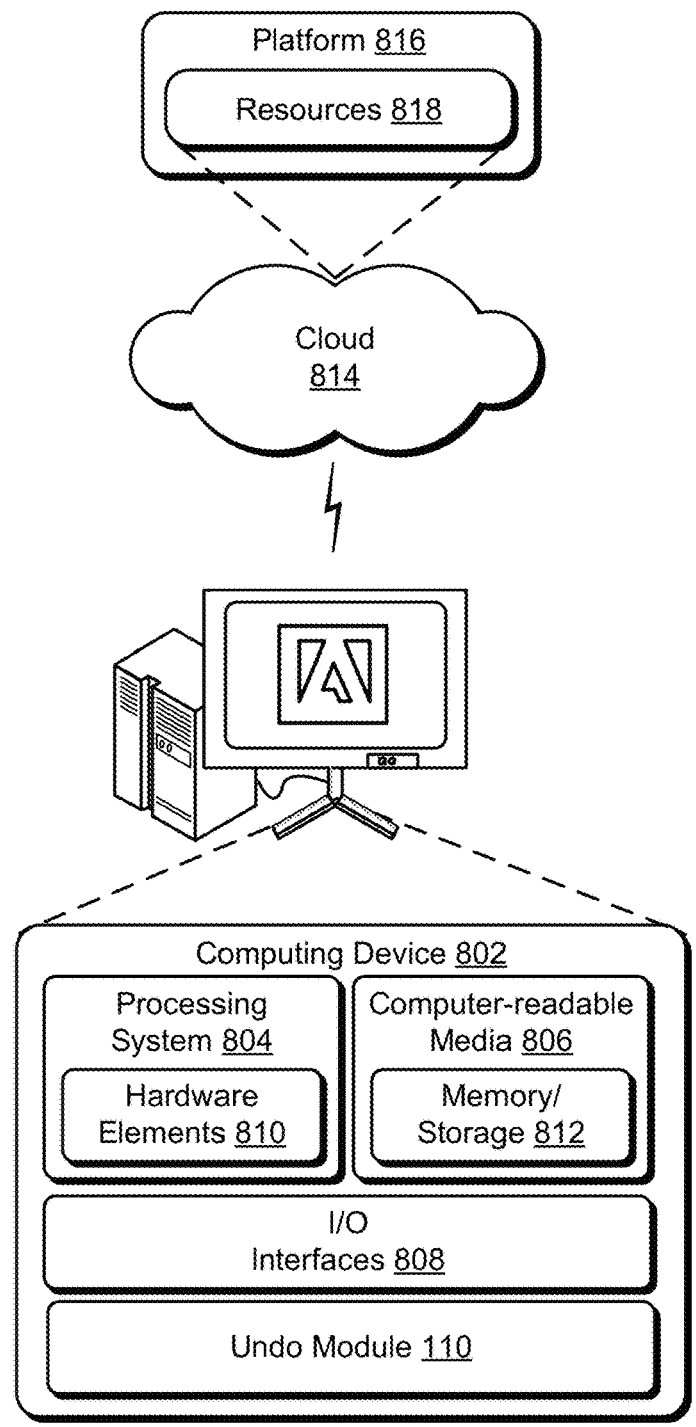
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the undo module 110. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage 812 includes volatile media (such as random access memory (RAM)) and/or nonvolatile media (such as read only memory (ROM), Flash memory, optical disks, magnetic disks, and so forth). In another example, the memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although implementations of systems for partially undoing content editing operations have been described in language specific to structural features and/or methods, it is to be understood that the appended claims are not necessarily limited to the specific features or methods described. Rather, the specific features and methods are disclosed as example implementations of systems for partially undoing content editing operations, and other equivalent features and methods are intended to be within the scope of the appended claims. Further, various different examples are described and it is to be appreciated that each described example is implementable independently or in connection with one or more other described examples.

What is claimed is:

1. In a digital medium environment for creating and editing digital content, a method implemented by a computing device, the method comprising:
receiving, by the computing device, editing data describing coordinates of an editing operation performed relative to digital content rendered in a user interface of a display device;
generating, by the computing device, a curve using regression to fit the curve to the coordinates of the editing operation;

determining, by the computing device, a local minimum of the curve and including a coordinate of the editing operation that corresponds to the local minimum of the curve in a subset of the coordinates of the editing operation;

identifying, by the computing device, an additional coordinate and an adjacent coordinate of the editing operation that are included in the subset of the coordinates;

removing, by the computing device, the adjacent coordinate from the subset of the coordinates based on a distance between the additional coordinate and the adjacent coordinate;

receiving, by the computing device, input data describing a request to partially undo the editing operation and a user selection of a particular coordinate included in the subset of the coordinates; and undoing, by the computing device, a portion of the editing operation performed between the particular coordinate included in the subset of the coordinates and an ending coordinate of the editing operation.

2. The method as described in claim 1, wherein the editing operation is an addition of a graphic element to the digital content.

3. The method as described in claim 1, wherein the editing operation is a removal of a portion of the digital content.

4. The method as described in claim 1, further comprising generating an indication of at least one coordinate that is included in the subset of the coordinates for display in the user interface.

5. The method as described in claim 1, further comprising:
receiving velocity data describing a velocity of an input device manipulated to perform the editing operation; and
including at least one coordinate of the editing operation in the subset of the coordinates based on the velocity data.

6. The method as described in claim 5, wherein the at least one coordinate corresponds to a minimum velocity described by the velocity data as the editing operation is performed.

7. The method as described in claim 1, further comprising:
receiving pressure data describing a pressure applied by an input device manipulated to perform the editing operation; and
including at least one coordinate of the editing operation in the subset of the coordinates based on the pressure data.

8. The method as described in claim 7, wherein the at least one coordinate corresponds to a minimum pressure described by the pressure data as the editing operation is performed.

9. In a digital medium environment for creating and editing digital content, a system comprising:
an editing module implemented at least partially in hardware of a computing device to:
receive editing data describing coordinates of an editing operation performed relative to digital content rendered in a user interface of a display device;
generate a curve using regression to fit the curve to the coordinates of the editing operation;
determine a local maximum of the curve and include a coordinate of the editing operation that corresponds to the local maximum of the curve in a subset of the coordinates of the editing operation;
identify an additional coordinate and an adjacent coordinate of the editing operation that are included in the subset of the coordinates; and
remove the adjacent coordinate from the subset of the coordinates based on a distance between the additional coordinate and the adjacent coordinate;
an interface module implemented at least partially in the hardware of the computing device to receive input data describing a request to partially undo the editing operation and a user selection of a particular coordinate included in the subset of the coordinates; and
a display module implemented at least partially in the hardware of the computing device to
undo a portion of the editing operation performed between the particular coordinate included in the subset of the coordinates and an ending coordinate of the editing operation.

10. The system as described in claim 9, wherein the editing module includes coordinates in the subset of the coordinates based on a duration of the editing operation.

11. The system as described in claim 9, wherein the editing module includes coordinates in the subset of the coordinates based on a distance between the coordinate and the additional coordinate.

12. The system as described in claim 9, wherein the editing module generates a sliding temporal or spatial window along the curve and the editing module includes coordinates in the subset of the coordinates based on minimum velocities of an input device manipulated to perform the editing operation within the sliding temporal or spatial window.

13. The system as described in claim 9, wherein the editing module generates a sliding temporal or spatial window along the curve and the editing module includes coordinates in the subset of the coordinates based on minimum pressures applied by an input device manipulated to perform the editing operation within the sliding temporal or spatial window.

14. The system as described in claim 9, wherein the editing module includes coordinates in the subset of the coordinates based on velocities of an input device that is manipulated to perform the editing operation that are below a velocity threshold.

15. The system as described in claim 9, wherein the editing module includes coordinates in the subset of the coordinates based on pressures applied by an input device that is manipulated to perform the editing operation that are below a pressure threshold.

16. The system as described in claim 9, wherein the editing operation is an addition of a graphic element to the digital content.

17. The system as described in claim 9, wherein the editing operation is a removal of a portion of the digital content.

18. One or more non-transitory computer-readable storage media comprising instructions stored thereon that, responsive to execution by a computing device, causes the computing device to perform operations including:
receiving editing data describing coordinates of an editing operation performed relative to digital content rendered in a user interface of a display device;
generating a curve using regression to fit the curve to the coordinates of the editing operation;
determining a local minimum of the curve and including a coordinate of the editing operation that corresponds to the local minimum of the curve in a subset of the coordinates of the editing operation;
identifying an additional coordinate and an adjacent coordinate of the editing operation that are included in the subset of the coordinates;

removing the adjacent coordinate from the subset of the coordinates based on a distance between the additional coordinate and the adjacent coordinate;

receiving input data describing a request to partially undo the editing operation and a user selection of a particular coordinate included in the subset of the coordinates; and undoing a portion of the editing operation performed between the particular coordinate included in the subset of the coordinates and an ending coordinate of the editing operation.

19. The one or more non-transitory computer-readable storage media as described in claim 18, wherein the editing operation is an addition of a graphic element to the digital content.

20. The one or more non-transitory computer-readable storage media as described in claim 18, wherein the editing operation is a removal of a portion of the digital content.

* * * * *